March 10, 1964 O. H. SCHADE, SR 3,124,169
APPARATUS FOR WINDING HELICAL WIRE GRIDS FOR ELECTRON TUBES
Filed March 9, 1959 3 Sheets-Sheet 1
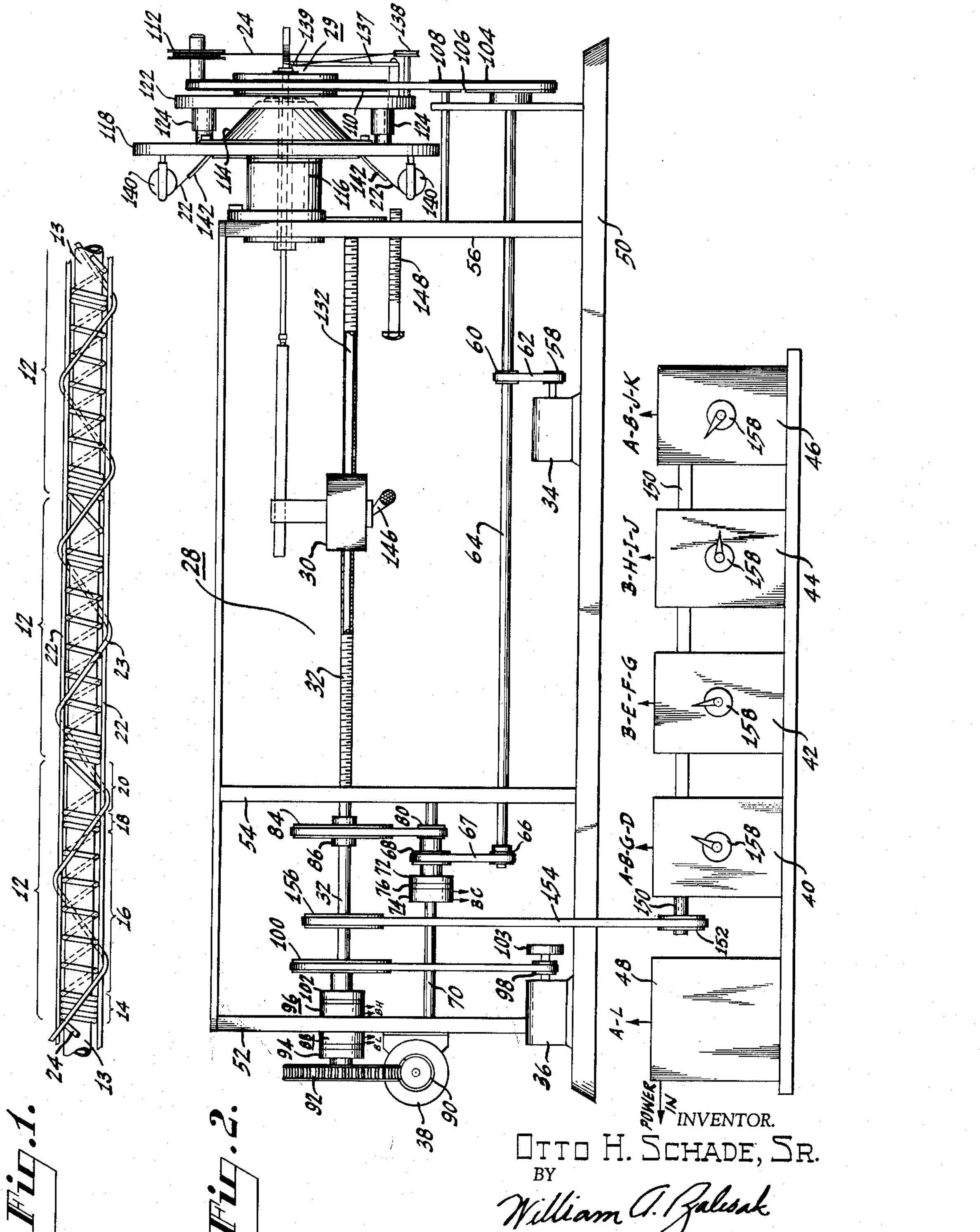

APPARATUS FOR WINDING HELICAL WIRE GRIDS FOR ELECTRON TUBES

Filed March 9, 1959

INVENTOR.
OTTO H. SCHADE, SR.
BY
William A. Zalesak
ATTORNEY

March 10, 1964 O. H. SCHADE, SR 3,124,169
APPARATUS FOR WINDING HELICAL WIRE GRIDS FOR ELECTRON TUBES
Filed March 9, 1959 3 Sheets-Sheet 3
Fig. 4.
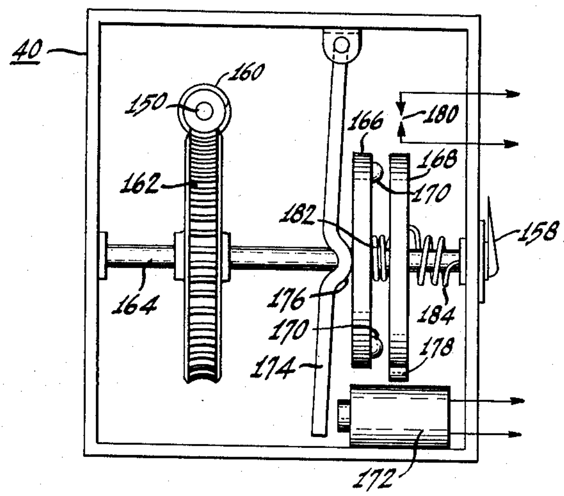
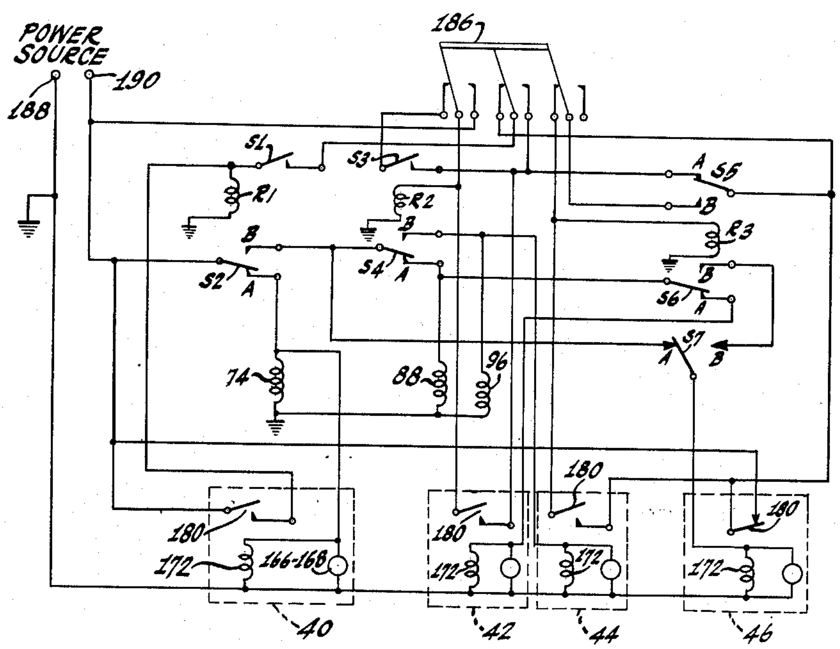
Fig. 5.
INVENTOR.
OTTO H. SCHADE, SR.
BY
William A. Zalesak
ATTORNEY

United States Patent Office 3,124,169

Patented Mar. 10, 1964

3,124,169

APPARATUS FOR WINDING HELICAL WIRE GRIDS FOR ELECTRON TUBES

Otto H. Schade, Sr., West Caldwell, N.J., assignor to Radio Corporation of America, a corporation of Delaware Filed Mar. 9, 1959, Ser. No. 798,152
3 Claims. (Cl. 140—71.5)

This invention relates to apparatus for winding helical wire grids for electron tubes and particularly to apparatus for automatically winding such a grid or series of grids having portions of different pitch.

It is known to fabricate grid electrodes for electron tubes by winding a wire into a series of helical turns and fixing the turns to one or more side rods. It is sometimes desired to fabricate such a grid with portions of different pitch (turns per inch ratio) in order to provide, for example, a grid with a tightly wound band at each end to give the grid rigidity. In addition, it is sometimes desired to wind a series of such grids onto a mandrel in tandem array with each grid unit separated from the adjacent grid unit by a short section of extremely high pitch (referred to as a skip winding). The series of grids are then separated into single units by severing each skip winding. In order to wind such a series of grid units, the grid winding machine must be capable of winding a predetermined length grid section of one pitch and then automatically changing to wind a second predetermined length grid section of a different pitch. Two or more such sections of two or more different pitches may be desired. In winding a series of such grids (referred to as a grid stick) onto a mandrel, it is necessary that extremely accurate reproduction of lengths of the various grid sections be achieved so that the unit grids can be separated by automatic severing apparatus. This, of course, would be impossible if a cumulative error in grid section length were permitted to build up.

In semi-custom grid fabrication, e.g., fabrication of experimental or special purpose tubes, it is advantageous if the grid winding apparatus can also be conditioned quickly and simply by a selector switch or adjustment to change the pitch of a given grid section, to change the length of any one of the different grid sections, or to wind different sequences of the different grid sections. In prior art machines these features are possible only by an inconvenient substitution of mechanical machine elements such as different cams or gears.

Accordingly, it is an object of this invention to provide extremely accurate cyclically automatic plural pitch grid winding apparatus.

It is another object of the invention to provide such apparatus in which the lengths of the grid sections of different pitch and the sequence of different pitch grid sections can be predetermined simply by a selector switch or dial settings of the apparatus.

Briefly, according to the invention grid winding apparatus comprises means for helically winding a wire at a constant turns per minute rate around a grid support, means for advancing the grid support at a plurality of predetermined speeds, and presettable counting and switching means for determining the distance of grid support advance for each of said plurality of speeds, for automatically switching from one grid support speed to another and for continuously cyclically repeating a preselected order of grid support speed changes.

In the drawings:

FIG. 1 is an elevation view of a grid stick representative of a type of grid which might be wound by the apparatus according to my invention;

FIG. 2 is an elevation view of grid winding apparatus according to the invention;

FIG. 4 is a partly schematic enlarged detail view of part of the apparatus of FIG. 2; and FIG. 5 is an electrical circuit schematic of the apparatus of FIG. 2.

Figure 3:
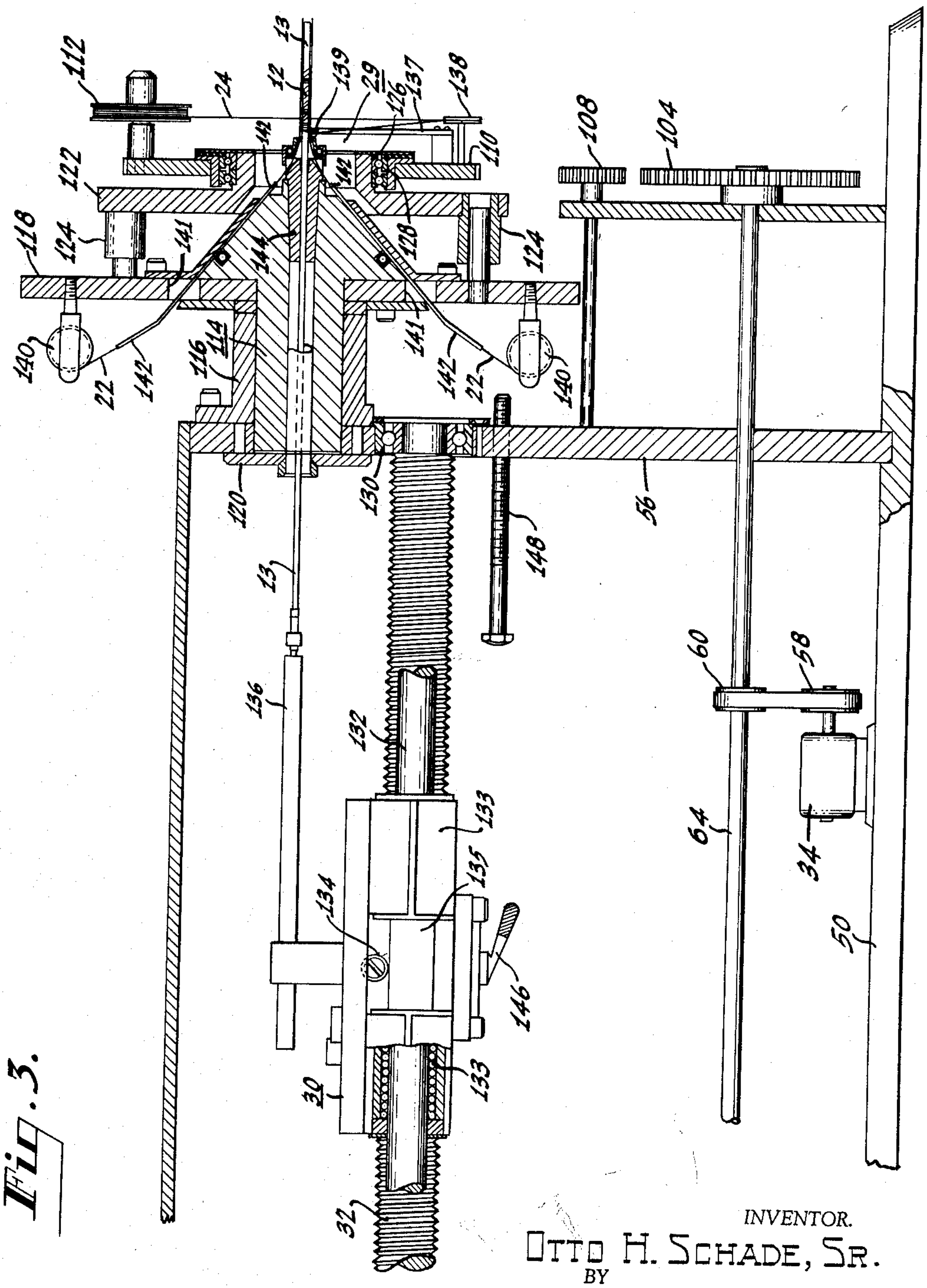
FIG. 3 is an enlarged partial section view of a portion of the apparatus of FIG. 2.

FIG. 1 illustrates a representative helical wire-wound grid 12 which can be fabricated by the apparatus according to my invention. For purposes of added illustration, FIG. 1 shows a series of three such grids 12 disposed on a mandrel 13 forming a part of a grid stick as fabricated by the invention. Each grid 12 comprises lateral wire sections including a tightly wound first band section 14, a section 16 of normal pitch, a tightly wound second band section 18, and a skip winding section 20. Each grid 12 also includes a plurality of side rod wires 22 disposed longitudinally on the outer surface of the helical turns and a temporary helical securing wire 23. Subsequently the side rods 22 and the lateral wire are brazed together and the securing wire 23 removed.

In the fabrication of the grids 12, a lateral wire 24 is helically wound about the mandrel 13 at a constant turns per minute rate. The mandrel 13 is advanced at different speeds in order to form the different pitch sections 14, 16, 18, and 20 of each grid 12. Accordingly, the mandrel 13 is advanced through a series of speed changes in cyclic fashion such that the sections of lateral wire 24 of a series of grids 12 are wound in tandem array along the mandrel 13. After the sections 14–20 of lateral wire 24 of a series of grids 12 are wound, the side rods 22 are laid down upon the lateral windings and the securing wire 23 wrapped therearound. The completed grid stick is then heated to braze the lateral wire 24 to the side rods 22, the securing wire 23 is removed, and the unit grids 12 are separated from each other by severing each helical skip winding 20. The unit grids 12 are then removed from the mandrel 13 for incorporation into a suitable electron tube electrode assembly.

In the fabrication of the type of helical wire wound grid illustrated in FIG. 1, it is almost always desired that the sections 14, 16, 18, and 20 be of different axial length. Moreover, as previously stated, if the unit grids 12 are to be separated by an automatically severing mechanism, cumulative error of axial length must be absolutely avoided. In addition, the grid winding mechanism must not only be capable of winding different pitches for different given section lengths but also must be capable of cyclically repeating the pitch and length changes in order to wind a series of grids upon a single mandrel 13. The achievement of these requirements by the invention will be rea 'ily appreciated from the following description thereof.

FIG. 2 illustrates grid winding apparatus 28 according to the invention in which a series of helical wire grids 12 are wound upon a mandrel 13 by a winding head 29 rotating at a constant speed. The mandrel 13 is mounted on a carriage 30 which is advanced by a lead screw 32. In the machine 28, three different speeds of mandrel advance are provided by a normal winding motor 34, a skip winding motor 36, and a band winding motor 38 all of which are continuously and simultaneously running during operation of the apparatus 28. The three motors, 34, 36, and 38, are individually coupled to the lead screw 32 through different coupling trains of different ratio in order to provide the three different desired speeds of mandrel advance. The number of turns of wire 24 wound by the winding head 29 for each of the grid sections, 14, 16, 18, and 20, is determined by a series of four revolution counters, 40, 42, 44, and 46, which are coupled directly to the lead screw 32. Various switching and engagement of the three motors, 34, 36, and 38, is accomplished by switches within the counters 40–46 and a series of relays and switches contained in a circuit box 48.

The apparatus 28 includes a frame comprising a base plate 50 and three up-right plates, 52, 54, and 56. The normal winding motor 34 is coupled, e.g., by driver and driven pulleys 58 and 60 respectively and a V-belt 62 to a first shaft 64 and drives the shaft in continuous rotation. A driver pulley 66 is keyed to the shaft 64 and coupled by a belt 67 to a driven pulley 68 mounted on a second rotatable shaft 70. The pulleys 66 and 68 and the belt 67 are provided with meshing teeth which prevents any slippage. All pulleys and belts of the apparatus 28 except the V pulleys and belt 58, 60, and 62 are of this type. The pulley 68 is freely rotatable on the shaft 70 but is fixed to one plate 72 of a magnetic clutch 74. A second plate 76 of the magnetic clutch 74 is keyed to the shaft 70 and can be locked to the first plate 72 by energization of the clutch solenoid. When the magnetic clutch 74 (hereinafter referred to as the normal winding clutch) is energized, the shaft 70 will be rotatably driven by the normal motor 34 through the shaft 64. Such rotation of the shaft 70 causes a driver pulley 80 keyed thereto to be rotated. The pulley 80 is belted to a driven pulley 84 mounted through an overrunning clutch 86 on the lead screw 32. The overrunning clutch 86 is so adapted that when the pulley 84 is driven by the pulley 80, the lead screw 32 will be rotated in response thereto. But, if the lead screw 32 is driven at a faster rate by another motor, the pulley 84 will not be carried in rotation along therewith.

The coupling ratio between the normal winding motor 34 through the elements 58, 60, 66, 68, 80, and 84 are such as to drive the lead screw 32 in rotation at a rate which will advance the mandrel carriage 30 therealong at a suitable speed for winding a normal turn section 16 of a grid 12.

The band winding motor 38 is adapted to be coupled to the lead screw 32 through a band winding magnetic clutch 88. A driver worm 90 is keyed to the shaft of the band winding motor 38 and meshes with a driven worm gear 92, which is fixed to one plate 94 of the band winding clutch 88. The worm gear 92 and the plate 94 of the band winding clutch 88 are freely rotatable on the lead screw shaft 32. This assembly, however, may be fixed for rotation with the lead screw shaft 32 by energization of the band winding clutch 88. Therefore, in response to such energization the lead screw 32 is driven by the band winding motor 38.

The skip winding motor 36 is adapted to be coupled to the lead screw 32 in response to energization of a skip winding magnetic clutch 96. The skip winding motor 36 has keyed to its shaft a driver pulley 98 which is belted to a driven pulley 100 on the lead screw shaft 32. The pulley 100 is fixed to a plate 102 of the skip-winding clutch 96 and together therewith is freely rotatable about the shaft 32. Upon energization of the skip-winding clutch 96 the plate 102 and pulley 100 are fixed for rotation with the lead screw shaft 32 thus providing drive thereto by the skip winding motor 36.

A fly wheel 103 is mounted on the shaft of the skip winding motor 36. Although fly wheels may be incorporated with any one or all of the motors 34, 36, and 38, such is most desirable with the skip-winding motor 36. The skip winding motor is arranged to drive the lead screw the fastest of the three speeds and thus must accelerate it when the motor is coupled thereto. On the other hand, the band winding motor 38 never has to accelerate the lead screw, and the normal winding motor 34 has the winding head 29 coupled thereto to serve as a fly wheel.

The actual winding of the grid wire 24 about the mandrel 13 to form the grid 12 is performed by the winding head 29. The winding head 29 is driven by the normal winding motor 34. A driver pulley 104 keyed to the shaft 64 is connected by a belt 106 over an idler pulley 108 and to a driven pulley 110 on which a supply reel 112 containing the lateral wire 24 is fixed.

As shown in FIG. 3, the winding head 29 includes a nose cone 114 rotatably mounted to the frame plate 56 within the bore of an annular flange 116 secured thereto. The nose cone 114 is disposed through a first annular disk 118 which abuts the extending end of the annular flange 116. The nose cone 114 is held in place by a retaining plate 120 bolted to the nose cone 114 and abutting the frame plate 56. A second annular disk 122 is mounted to the first annular disk 118 in spaced relation thereto by a series of bolts 124. The second annular disk 122 includes a cylindrical bearing surface 126 disposed adjacent the apex of the nose cone 114. The winding head pulley 110 is rotatably mounted through a ball bearing 128 on the cylindrical bearing surface 126. The wire supply reel 112 is mounted near the periphery of the winding head pulley 110 such that its axis is parallel to the axis of the winding head pulley 110.

The lead screw 32 is rotatably mounted in the frame plate 56 by a ball bearing 130 and drives the mandrel carriage 30 therealong. The mandrel carriage 30 is supported on a pair of rods 132 (only one of which is shown) by four ball bearing assemblies 133 on its four corners. A roller bearing 134 prevents rotation of the floating lead screw unit assembly 135. The mandrel carriage 30 includes a mandrel holder 136 which is disposed in alignment with the nose cone 114. As such, a mandrel 13 can be fitted to the mandrel holder 136 and extended into and through the nose cone 114 to emerge from the far end thereof adjacent the wire supply reel 112. A wire guide 137 mounted on the drive pulley 110 is provided for maintaining the winding of wire 24 a fixed distance from the pulley 110. The wire guide 137 is a leaf spring whose end bears against the end of the nose cone and rotates around the mandrel 13. The wire 24 is fed over an idler pulley 138 and a pin 139 on the wire guide 137.

In operation, the winding head pulley 110 is driven by the normal winding motor 34 simultaneously with rotary drive supplied to the lead screw 32 by one of the three motors 34, 36, or 38. Accordingly, the mandrel 13 is axially advanced through the nose cone 114 simultaneously with the winding of a lateral wire 24 thereabout from the revolving wire supply reel 112. According to the invention the winding head pulley 110 is rotatably driven at a constant rate while the mandrel 13 is cyclically advanced at the desired plurality of different speeds.

A plurality of side rod wire supply reels 140 are mounted near the periphery of the first annular disk 118. A side rod wire 22 is thus laid down on an advancing mandrel 13 by threading it through an aperture 141 in the annular disk 118 and through a small tube 142 which is disposed along the conical surface of the nose cone 114. The side rod wires 22 emerge from the small tubes 142 adjacent the advancing mandrel 13 where they are laid down longitudinally therealong.

From the drawing it will be appreciated that the winding wire supplied from the supply reel 112 is wound around the mandrel at a point farther along the mandrel than the point at which side rod wires 22 are laid down therealong. Therefore, in order to fabricate the grid 12 having side rod wires 22 disposed on the outer surface of the helical lateral wire 24, a two-pass operation of the apparatus 28 is required. On the other hand should it be desired to fabricate a grid wherein the side rod wires are inside the helical lateral winding wire 24, a single-pass operation can be employed in which the side rods 22 are first laid down directly upon the mandrel 13 and then the helical lateral wire 24 wound thereabout. After so fabricating an internal-side rod grid, the structure is heated to braze the side rod wires 22 to the helical lateral wire. Subsequently the series of grids are separated into single units. It will, of course, be appreciated that two winding heads 29 can be incorporated on a single machine to wind the grid 12 in a single pass. In such case the first winding head winds only the lateral wire 24 and the second lays down the side rods 22 and winds the securing wire 23.

In the two-pass operation, as used for the fabrication of the grid 12 of FIG. 1 by the apparatus 28 illustrated, only the helical lateral wire 24 is laid down during the first pass of the mandrel 13 through the nose cone 114. As such, the helical lateral wire 24 is wound directly upon the mandrel 13. After such a winding operation is completed, the mandrel carriage 30 is retracted away from the nose cone 114 and the mandrel 13 again placed on the mandrel holder 136 and extended into the nose cone 114. In order to accommodate the mandrel 13 (now increased in diameter by the helical lateral winding thereon) the nose cone 114 is provided with an insert 144 which can be removed and replaced by a similar insert having a slightly larger diameter bore.

The second pass of the two-pass operation is then performed. The mandrel 13 carrying the helical lateral winding is advanced past the side rod wire tubes 142 such that a desired plurality of side rod wires 22 are laid down along the surface thereof. The supply reel 112 is filled with a suitable securing wire 23 which is wound about the side rods 22 to retain them in place until they can be subsequently fixed to the previously wound wire 24 by brazing. In this pass of the two-pass operation, the lead screw 32 is rotatably driven at a suitable speed, e.g., the skip winding speed, so as to provide only as fine of pitch securing wire winding as is necessary to retain the assembly of grid wires in place until they can be brazed.

As a safety measure, the mandrel carriage 30 is provided with a clutch (not shown) for disengaging the carriage from the lead screw 32. This clutch can be disengaged by actuation of a clutch lever 146. Accordingly, a suitable stop 148 is mounted on the frame plate 56 and so positioned that the clutch lever 146 will contact the end of the stop when the mandrel carriage 30 has been advanced to adjacent the frame plate 56. As such, a forced driving of the mandrel carriage 30 against the frame plate 56 is prevented.

In operation the three motors 34, 36, and 38 are continuous running and engagement thereof to drive the lead screw 32 is arranged to be mutually exclusive of each other, i.e., only one of the three motors is ever engaged with the lead screw 32 at any one time. To obtain and assure such operation the apparatus 28 is provided with counting and switching apparatus adapted to cyclically engage the three motor drives one at a time. Such counting and switching is accomplished by apparatus housed in one of the four counter boxes 40, 42, 44, and 46 and in the circuit box 48.

The four counters 40–46 are geared to a common timing shaft 150 to which a driven pulley 152 is keyed. The pulley 152 is coupled by a belt 154 to a driver pulley 156 which is keyed to the lead screw shaft 32. The four counters 40–46 are adapted to close their own switches after counting a predetermined number of revolutions of the lead screw shaft 32 and collectively to energize themselves cyclically. Actuation of the counter switches serves to selectively and cyclically energize the three magnetic clutches 74, 88, or 96 to thus engage the three motors 34, 36, and 38 in accordance with a predetermined number of revolutions of the lead screw 32. The counters 40–46 are each provided with a dial adjustment mechanism 158 which can be set to determine the number of revolutions which the lead screw shaft 32 must make in order to actuate that counter's switch after it begins counting.

FIG. 4, partly in schematic, represents the manner in which each of the counters 40–46 functions. In the counter 40, which is representative of each of the counters, the timing shaft 150 is keyed to a driver worm 160 which in turn meshes with a driven worm gear 162 keyed to a rotatable shaft 164. Two clutch disks 166 and 168 are mounted on the shaft 164. The first disk 166 is keyed to the shaft for rotation therewith and upon actuation serves to drive the second disk 168 which is freely rotatable about the shaft. The driver disk 166 has attached thereto a plurality of rubber pads 170 facing the driven disk 168. The driver disk 166 is also slidable in a spline (not shown) along the shaft 164 toward the driven disk 168 such that the rubber pads 170 can contact the driven disk 168. A solenoid 172 has associated therewith a fork member 174 which is pivotally mounted to one wall of the counter 40. The fork 174 is formed with a projecting bearing surface 176 adjacent the shaft 164 and bears against the driver disk 166. The fork 174 and solenoid 172 further co-operate such that the fork 174 is attracted to the solenoid 172 upon energization thereof. Such energization serves to slide the driver disk 166 into contact with the driven disk 168 and effect rotation of the driven disk.

The driven disk 168 which serves also as a camming disk has a high portion 178. As such, the driven camming disk 168, after a predetermined angle of rotation during engagement with the driver disk 166, will serve to actuate a pair of switch contacts 180. The amount of rotation of the driven camming disk 168 necessary in order to actuate the contacts 180 is determined by the setting of the dial 158 on the front of the timer 40.

When the solenoid 172 of the counter 40 is deenergized, a spring 182 will separate the two disks 166 and 168 and return the fork 174 to the position as shown. Such separation of the disks 166 and 168 will serve to cease rotation of the camming disk 168 and permit a spring 184 to rotatably return the camming disk 168 to its original position. Such return of the camming disk 168 permits the contacts 180 which are self-spring biased to return to their original condition. The four timing mechanisms 40, 42, 44, and 46 differ from each other only in the gear coupling ratio of the worm and pinion 160–162 and in that the contacts 180 are normally open in counters 40, 42, and 44 and are normally closed in counter 46.

According to my invention each of the four counters 40–46 is so circuited that deenergization of the solenoid 172 of one of the counters will energize the solenoid 172 of another of the counters. Thus, when one counter is energized, it begins counting a predetermined number of revolutions of the timing shaft 164 according to the setting of its dial 158. After this predetermined number of rotations of the timing shaft 164, that counter's contacts 180 are momentarily actuated. Such actuation serves to deenergize the solenoid 172 of the same counter and energize the solenoid of another one of the counters. Also, such actuation of the contacts 180 serves through a series of relays and switches to deenergize one and energize a different one of the magnetic clutches 74, 88, and 96. Thus, a cyclical switching of each of the motor drives 34, 36, and 38 into engagement with the lead screw shaft 32 is effected and maintained for a predetermined number of revolutions of the lead screw shaft 32 according to a predetermined setting of the dials 158 of the counters 40–46. A more detailed cyclical operation of the apparatus 28 is hereinafter described with reference to the circuit diagram of FIG. 5.

The circuit of FIG. 5 represents one manner in which the apparatus 28 may be electrically circuited. The particular circuit shown is provided with a sequence switch 186 which permits a quick change from one of two types of grid winding operations. In the position shown, the switch 186 will cause the apparatus 28 to wind a grid 12, as illustrated in FIG. 1. Accordingly, in the position shown the machine will wind a normal winding, a first band winding, a skip winding, and a second band winding, in the order named and then continuously repeat this sequence.

In some situations it is desired that a grid comprise only a normal winding 16 and a skip winding 20. Accordingly, moving of the switch 186 to the alternate position will cause the apparatus 28 to wind such a grid, i.e., cyclically repeat the sequence a normal winding 16 and a skip winding 20 and completely omit the winding of any band sections 14 or 18. In the same manner, a multi-plate sequence switch and appropriate circuitry can be provided to obtain any number of desired cyclical variations of different grid designs.

In the circuit of FIG. 5 the solenoid winding 172 and the contacts 180 of each of the counters 40, 42, 44, and 46 are shown enclosed in a dashed box designated with the particular counter numeral designation. The solenoids of the three magnetic clutches 74, 88, and 96 are designated with the respective numerals of the three clutches. All other components of the circuit of FIG. 5 are housed in the circuit box 48. Suitable conductors electrically connect the three clutches and the four timer boxes to the circuit box and are shown respectively in FIG. 2 by arrows with matching letter designation.

In the arrangement shown in FIG. 5, counter 40 is circuited to count the length of a normal winding 16, counter 42 to count a band winding 18, counter 44 to count a skip winding 20, and counter 46 to count the cumulative length of a band winding 18, a skip winding 20, and a second band winding 14. The dials 158 of the four counters are preset to give the desired respective lengths of the various grid sections. The circuit is further shown in a condition to begin winding a normal winding 16 upon application of power to the terminals 188 and 190.

When power is applied between the terminals 188 and 190, the normal winding clutch 74 is energized and advances the mandrel 13 for the winding of a normal grid section 16. At the same time the solenoid 172 of counter 40 is energized thus beginning a counting operation operation by the counter 40.

When a normal winding section 16 is completed, the contacts 180 of counter 40 are momentarily actuated thus energizing relay R1. When R1 is energized: switch S1 closes to maintain R1 energized; and switch S2 changes from contact A to contact B which deenergizes the normal winding clutch 74 and the solenoid of counter 40 and energizes the band winding clutch 88 and the solenoids of counters 42 and 46. Thus, counters 42 and 46 begin a counting operation as the winding of band section 18 is begun.

When a band winding section 18 is completed, the contacts of counter 42 are momentarily actuated thus energizing relay R2. The energization of R2; closes its own hold switch S3; and changes switch S4 from contact A to contact B which deenergizes the band winding clutch 88 and the solenoid of counter 42 and energizes the skip winding clutch 96 and the solenoid of counter 44. Thus, winding of the skip section 20 is thus begun as counter 44 begins a counting operation and counter 46 continues its cumulative counting operation.

When a skip winding section 20 is completed, the contacts of counter 44 are momentarily actuated, thus energizing relay R3. Energization of R3 changes switch S5 from contact A to contact B holding R3 energized and deenergizing R2. Deenergization of R2 causes its own hold switch S3 to open and changes switch S4 from contact B to contact A which deenergizes the skip winding clutch 96 and the solenoid of counter 44 and energizes the band winding clutch 88. Energization of R3 also changes switch S6 from contact A to contact B which is out of circuit. Counter 46 continues its cumulative counting operation as winding of a band section 14 is begun.

When a band section 14 is completed, the contacts of counter 46 are momentarily actuated thus deenergizing R3 and R1. Deenergization of R1 opens its own hold S1 and changes S2 from contact B to contact A which deenergizes the solenoid of counter 46 and the band winding clutch 88 and energizes the normal winding clutch 74 and the solenoid of counter 40. The deenergization of R3 changes S5 from contact B to contact A which opens R3's own hold. The deenergization of R3 also changes S6 from contact B to contact A which is presently out of circuit. Upon actuation of the switching described in this paragraph, a complete grid unit 12 has been wound and the winding of a second normal section 16 is begun.

As described above, counter 46 serves to count for the cumulative length of a band section 18, a skip section 20, and a band section 14. If desired, switch S7 can be changed from contact A to contact B and, as a result, cause the counter 46 to count only the band section 14 rather than the cumulative length of both band sections and an intermediate skip section.

As previously described, the sequence switch 186 may be changed to its other position (than shown in FIG. 5) to cause the apparatus 28 to wind a series of grid units comprising a normal winding 16 and a skip winding 20 only. In such a condition of the squence switch 186, the following cyclic operation of apparatus 28 results.

When power is applied to the contacts 188 and 190, relay R2 is immediately energized and remains energized thus maintaining S3 in a closed condition and S4 closed through its contact B. Upon such application of power to the contacts 188 and 190, the normal winding clutch 74 and the solenoid of timer 40 are energized, thus beginning the winding and counting respectively of a normal winding section 16.

When a normal winding section 16 is completed, the contacts of counter 40 are momentarily actuated thus energizing R1. Energization of R1 closes S1 to hold R1 energized and changes S2 from contact A to contact B which deenergizes the normal winding clutch 74 and the solenoid of counter 40 and energizes the skip winding clutch 96 and the solenoid of counter 44. The winding and counting of a skip section 20 is thus simultaneously begun.

Upon completion of the winding of a skip section 20, the contacts of counter 44 are momentarily actuated thus energizing R3. Energization of R3 changes S6 from contact A to contact B which is out of circuit. Energization of R3 also changes S5 from contact A to contact B which deenergizes R1 causing its own hold switch S1 to open and changes S2 from contact B to contact A thus energizing the normal winding clutch 74 and the solenoid of counter 40. This simultaneously begins the winding and counting of a second normal section 16. Accordingly, a complete winding of a grid unit is performed and a second such unit begun.

The apparatus 28 has been described as including three coupling trains of different ratio to provide three different desired speeds. However, this same plural speed feature can also be obtained by providing the motors 36 and 38 as variable speed motors. In so doing a further variable factor is obtained in that the pitch of the grid sections wound by these motors can be adjusted through a range of different pitches.

It will also be appreciated that the apparatus 28 can be powered by a single motor which can be coupled to the lead screw 32 through any one of a plurality of different ratio of gear or belt trains to give the desired plurality of speeds. Such an arrangement may be desired in a mass production application of the invention where it is desired to produce a single type of grid. On the other hand, in some applications as hereinbefore stated, the three separate motors may be desired for the purpose of flexibility.

Accordingly, it will be appreciated that the apparatus 28 according to the invention provides: (1) individual selection of the pitch of a plurality of different grid sections by electrical adjustment of the motor speeds; (2) individual selection of the length of said plurality of grid sections by a dial setting (dial 158); and (3) selection of grid-section composition including sequence thereof of a grid by an electrical switch (sequence switch 186).

What is claimed is:

1. Apparatus for winding variable pitch helical wire grids for electron tubes comprising supporting mandrel means, means for winding a helical grid wire around said mandrel at a constant rate, means for longitudinally advancing said mandrel at a plurality of different speeds to wind plural pitch helical grids, said last-named means comprising a lead screw coupled to said mandrel for longitudinally advancing said mandrel, a plurality of drive motors adapted for engagement with said lead screw, each of said motors adapted to rotate said lead screw at a different angular velocity, a plurality of electrically operable clutches for selectively and independently coupling a different one of said plurality of drive motors to said lead screw, switch means for actuating said plurality of clutches, counting apparatus for selectively cyclically actuating said switch means, said counting apparatus comprising cam means for operating said switch means, means coupled to said lead screw for moving said cam means in synchronization with the advance of said mandrel, and manual means permitting adjustment of the position of said cam means for changing the amount of advancement of said mandrel at each of said plurality of speeds.

2. Apparatus for winding variable pitch helical wire grids for electron tubes comprising supporting mandrel means, means for winding a helical grid wire around said mandrel at a constant rate, means for longitudinally advancing said mandrel at a plurality of different speeds to wind plural pitch helical grids, said last-named means comprising a lead screw coupled to said mandrel for longitudinally advancing said mandrel, a plurality of drive motors adapted for engagement with said lead screw, each of said motors adapted to rotate said lead screw at a different angular velocity, a plurality of electrically operable clutches for selectively and independently coupling a different one of said plurality of motors to said lead screw, switch means for actuating said plurality of clutches, counting apparatus for selectively cyclically actuating said switch means, said counting apparatus comprising cam means for operating said switch means, means coupled to said lead screw for moving said cam means in synchronization with the advance of said mandrel, and dial means operably connected with said cam permitting adjustment of the position of said cam means during operation of said apparatus for changing the amount of advancement of said mandrel at each of said plurality of speeds.

3. Apparatus for producing a stack of grids comprising a helix having a plurality of groups of turns, the turns of each group having a constant pitch and the pitch of the turns in one group being different from the pitch of the turns in another group, said apparatus comprising a grid support means, a grid helix winding means for winding a helix around said support means, driving means for moving said grid support means and said grid winding means at predetermined speeds with respect to each other, said driving means including a plurality of constant speed motors each separately and mutually exclusively engageable with one of said grid support means and said grid winding means, grid turn counter means for counting the turns in a group of turns, clutch means responsive to said grid turn counter means for engaging a predetermined one of said motors to change the speed of said driving means from a first to a second speed, a further grid turn counter means for counting the turns in a further group of turns, and further clutch means responsive to said further counter means to engage a previously engaged one of said motors to restore the speed of said driving means to said first speed, still further counter means, and still further clutch means responsive to said still further counter means to engage another one of said motors to adjust the speed of said drive means to a third speed different from said first or said second speed.

References Cited in the file of this patent

UNITED STATES PATENTS

| | | |
|---|---|---|
| 1,970,599 | Franke | Aug. 21, 1934 |
| 2,411,988 | Drieschman et al. | Dec. 3, 1946 |
| 2,415,854 | Sheffield | Feb. 18, 1947 |
| 2,422,827 | Drieschman et al. | June 24, 1947 |
| 2,426,522 | Porter | Aug. 26, 1947 |
| 2,480,677 | Sheffield | Aug. 30, 1949 |
| 2,633,552 | Rainone | Mar. 31, 1953 |
| 2,719,544 | Hirmann | Oct. 4, 1955 |
| 2,725,901 | Engel | Dec. 6, 1955 |
| 2,759,499 | Gartner | Aug. 21, 1956 |
| 2,959,367 | Kuba et al. | Nov. 8, 1960 |